Nov. 27, 1934.　　　　G. C. PFAFF　　　　1,982,480
APPARATUS FOR PRODUCING PHOSPHATIC FERTILIZER
Filed Aug. 19, 1932　　　2 Sheets-Sheet 1

Inventor
GEORGE C. PFAFF
By Semmes & Semmes
Attorneys

Nov. 27, 1934.   G. C. PFAFF   1,982,480
APPARATUS FOR PRODUCING PHOSPHATIC FERTILIZER
Filed Aug. 19, 1932   2 Sheets-Sheet 2

Inventor
GEORGE C. PFAFF
By Semmes & Semmes Attorneys

Patented Nov. 27, 1934

1,982,480

UNITED STATES PATENT OFFICE 1,982,480

APPARATUS FOR PRODUCING PHOSPHATIC FERTILIZER

George C. Pfaff, Baltimore, Md., assignor to The Oberphos Company, Baltimore, Md.

Application August 19, 1932, Serial No. 629,547

8 Claims. (Cl. 259—4)

This invention relates to the production of fertilizer and more particularly to an improved apparatus for producing phosphatic fertilizers. The present invention is an improvement of the apparatus described in copending application Serial No. 394,130, filed September 20, 1929.

A recently proposed improved method of producing fertilizers comprises essentially charging finely divided unavailable phosphatic fertilizer and an acid to a compounding zone in which respectively predetermined quantities of acid and dust are admixed in a constant ratio. From the compounding zone the mixture is passed to a receiving and conversion or digestion stage wherein the phosphatic fertilizer is converted from the unavailable to the available forms, under controlled conditions of temperature and pressure. After complete conversion the material is dried within the conversion stage by a proper readjustment of physical conditions therein.

The present invention relates particularly to the described process and more specifically to a novel apparatus for compounding the reacting ingredients prior to their admission to the digestion stage.

In order to more clearly explain the invention a mechanical embodiment is shown in the accompanying drawings, in which.

Figure 2:
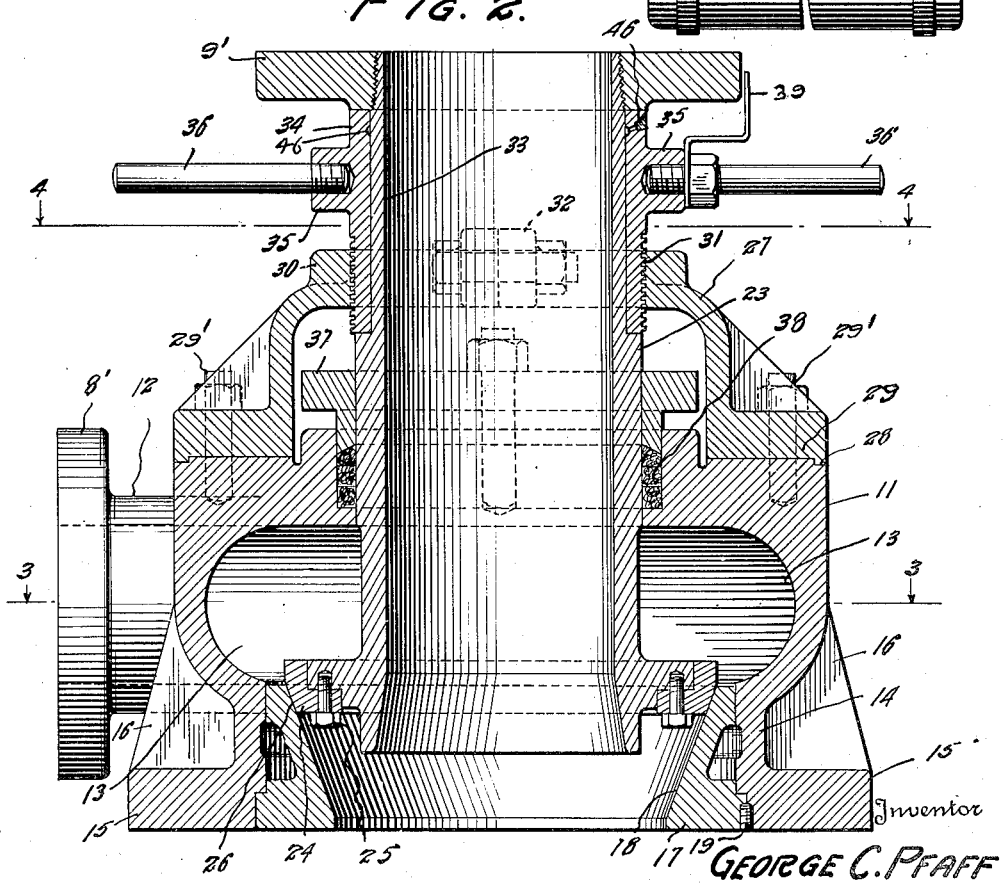
Fig. 2 is an enlarged longitudinal section of the compounding device.
Figure 3:
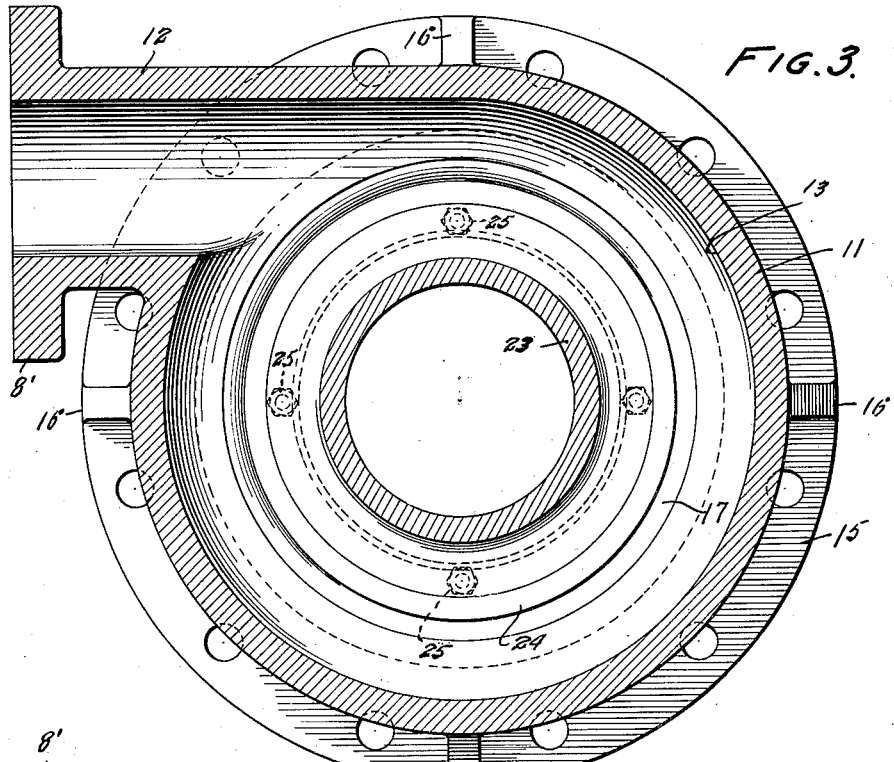
Figure 4:
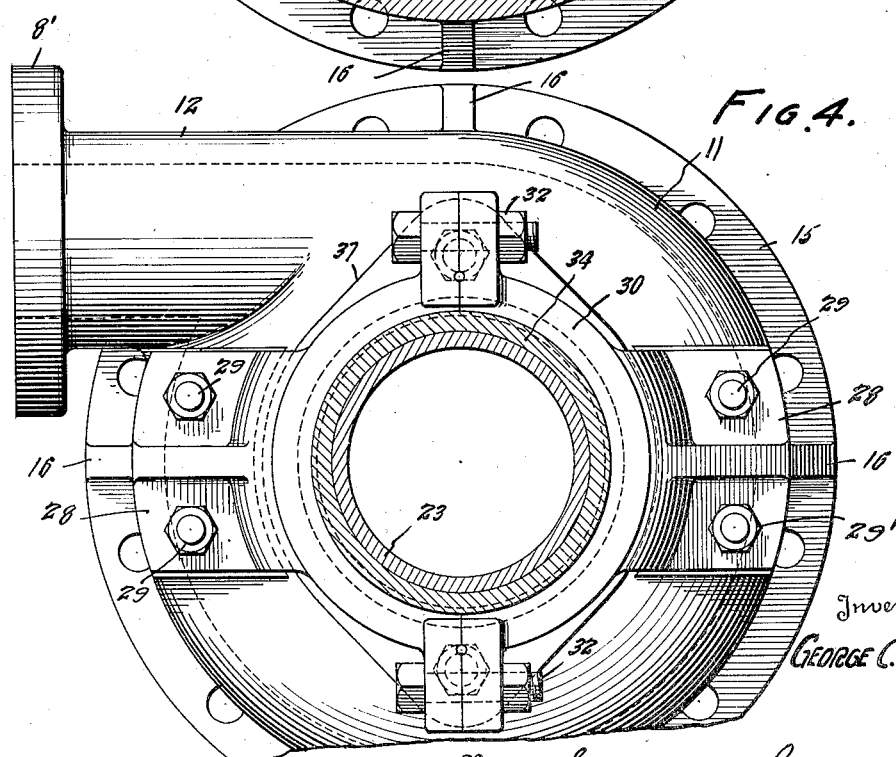

Figs. 3 and 4 are cross sections taken on lines 3—3 and 4—4 respectively of Fig. 2.

In the improved process above referred to, charging of the ingredients was accomplished by impinging streams of acid and dust in such a manner that a substantial conoidal stream of acid encompassed or enclosed the dust and the mixed stream was then passed to the digestion stage. The flow of dust and acid was further insured and controlled by maintaining certain positive pressures thereon.

The charging method of the present invention, like that of the prior application referred to, includes the institution of a stream of dust flowing towards the receiving stage and the encompassing of this stream, at a point intermediate the dust hopper in the receiving stage, by a conoidal stream of acid. According to the present invention refinements in the apparatus are made whereby a better control of the respective quantities of dust and acid is insured and replacement and cleaning of the mixing device improved.

In the preparation of phosphatic fertilizers according to the described method it is highly advantageous to insure as complete a mixture of the rock dust and acidulating agent as is possible. A method inherent in the apparatus about to be described involves the extenuation of a solid stream of acid into a continuous cylindrical film or atomized cloud of maximum surface area and the conformation of a stream of dust to the general configuration of the acid stream so as to insure maximum area of contact and rapid and thorough mixing of the reactive ingredients. In this manner the wetting power of a given volume of acid is substantially completely utilized and a greater homogeneity in the mix is insured.

Figure 1:
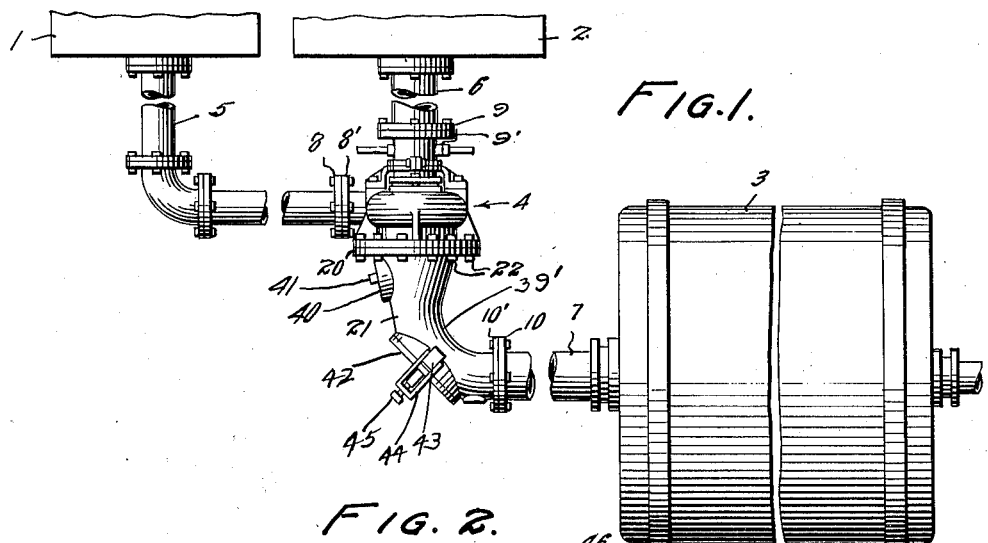
Fig. 1 is a perspective view of the compounding device in its association with sources of raw material and the digestion stage.

As shown in the accompanying drawings the main group of mechanical elements involved in the process include an acid tank 1, a dust hopper 2, and the horizontal rotary autoclave 3, which latter communicates with the acid tank and dust hopper through the improved mixing device indicated generally at 4. The hopper and autoclave may be of any desired construction, such for example as are described in copending application Serial No. 304,789, filed Sept. 8, 1929 or Serial No. 393,826, filed Sept. 19, 1929. The acid and dust hoppers, of whatever type, as shown, communicate with the improved charging device 4 through the discharge lines 5 and 6 respectively. The discharge end of the mixing device communicates with the autoclave through the line 7. In Fig. 1 these lines are shown broken away to indicate that the acid and dust hoppers may be located at any desired distance from the mixing valve and that similarly the autoclave may be positioned at some distance from the mixing valve.

The receiving and digestion stage which, as noted above, preferably comprises a horizontal rotary autoclave, is adapted to receive the homogeneous mixture of acid and rock from the mixing device. In the preferred mechanical embodiment the discharge line 7 is connected to the autoclave on its axis of rotation and is suitably gasketed so as to permit the institution and maintenance of any desired vacuum in the autoclave. The lines 5, 6 and 7 are each provided with flanges 8, 9 and 10 which respectively abut the corresponding flanges 8', 9' and 10' formed on the inlet and outlet openings of the charging device.

As shown in Fig. 2 the charging device itself includes means for spreading or extenuating a solid stream of acid into a hollow stream or spray of maximum surface area, and means to direct the similarly conformed stream of dust into the interior of the hollow stream of acid. Cooperating with these means are other means designed to give added turbulence to the mixed mass and to direct the conjoined stream towards the autoclave. The charging valve comprises a body portion 11 which may be made of any suitable material, such as cast iron. This body portion is so cast or formed as to present an induction channel for the acid and an eduction channel for the mixture of acid and dust. The inlet or induction channel includes the pipe section 12 provided with the terminal securing flange 8'. This pipe section is extended in a toroidal shape, shown in Fig. 3, so as to present a circular wall 13 forming a continuation of the wall or pipe 12. The lower sections of the wall 13 are extended downwardly as at 14 to form a discharge opening. The lower walls 14 are extended laterally to provide the flanges 15, by reason of which the valve proper may be secured to its discharge neck. At this point the valve body is provided with strengthening or rigidifying flange 16.

Mounted in the outlet or eduction space of the valve is a valve seat 17. This may be composed of any suitable corrosion resistance material, such as monel metal. This member is formed with the internal surface 18 formed on any desired taper. The exterior surface of the valve seat 17 tightly abuts the contiguous face of the wall 14 and is locked in this position by the locking means 19. The bottom of the surfaces of the flange 15 and the valve seat 17 are flush and are each adapted to rest upon the flange 20 formed on the discharge spout 21. The valve proper and the discharge spout may be readily secured together by any securing means, such as by bolts or nuts 22. The valve body, as noted above, functions to extenuate a solid stream of acid into a hollow conoidal stream which encompasses a solid stream of dust. In the present method this is accomplished by providing the adjusting sleeve 23. This comprises a hollow tube extending from the valve seat up to the securing flange 9', through which it is secured to the dust discharge line 6. At its lower end the adjusting sleeve terminates adjacent the valve seat and is provided with a detachable circular sleeve ring 24. As noted in Fig. 2, this sleeve ring on the interior surface is formed by two angularly disposed flanges, by reason of which it is adapted to abut a correspondingly formed portion of the sleeve 23 and the ring is held in locked position by means of the lock nuts 25. The exterior surface of the sleeve ring is formed with a tapered surface 26 which conforms to the taper of the interior face 18 of the valve seat. The sleeve ring 24 is preferably made of some corrosion resistance material such as monel metal.

Attached to the upper portion of the valve seat 11 is a yoke 27 of cast iron or other suitable material. This is formed with terminal flanges 28 and 29, which fit in respectively conformed surfaces on the upper portion of the valve seat and the yoke is locked to the valve seat by means of the bolt and nut construction 29'. The upper portion of the yoke is formed with a hollow circular ring 30. This is interiorally threaded as at 31. As shown in Fig. 4 the yoke is made up in two sections which may be secured together by the bolt and nut construction 32 to form an integral ring member.

At its upper portion adjacent the ring 30 the adjusting sleeve 23 is cutaway so as to provide a cylindrical section 33 of reduced width. Mounted upon the cylindrical section and circumferentially movable with respect thereto is a sleeve 34. This is provided with tapped threaded lugs 35 in which are received the adjusting handles 36. The upper portion of the sleeve 23 is externally threaded to receive the corresponding threads of the flange 9', by reason of which the sleeve is locked to the flange.

At some intermediate portion of its length the sleeve 23 passes through the valve body 11 to a suitable seal. This is shown in Fig. 2 as comprising a bronze gland 37 which retains the packing material 38 in position. The gland is held in locked position by means of the bolt and nut 37. The packing material preferably comprises graphitized asbestos.

Mounted on one of the lugs 35 and locked in its position by the member 36 is a pointer 39. This cooperates with a calibrated scale, not shown, formed on the adjacent rim of the flange 9'.

It will be noted from the description thus far given that the sleeve 23 and the sleeve seat 24 may be moved vertically by rotating the sleeve member 34. Due to its engagement with the yoke 27 and its free rotative movement on the sleeve 23, the sleeve member 34 causes a vertical displacement upwardly or downwardly, depending upon its rotation, of the adjusted sleeve 23 with respect to the yoke 27 and the valve body.

As noted hereinbefore the charging valve is attached at its discharge end to means which are designed to impart added turbulence to the mixture. This additional agitation is obtained by the spout 21. This spout is connected to the discharge end of the valve, as noted hereinbefore, by means of the bolts 22. The spout comprises a single member which tapers inwardly from its point of adjustment to the valve body and then is curved at an intermediate section 39' and terminates in a substantially straight portion which is attached to the discharge pipe 7. In such a structure, as will be appreciated, the mixture is forcibly ejected from the valve and, by impinging on the subjacent curved surface an added turbulence is given which improves the mixing of the ingredients.

Adjacent the point of connection with the valve body the spout is provided with a manhole cover 40 which is secured thereto by means of a bronze bushing into the valve spout. The stem 41 of the manhole may be squared or otherwise conveniently shaped so as to provide for receiving a detaching tool. The interior of the manhole cover (not shown) is curved to conform to the curvature of the spout. This manhole provides for easy inspection and cleaning of the interior of the valve.

Near the lower discharge end of the spout and placed on the curved neck is a manhole cover, indicated generally at 42. The body of the spout is formed with lugs 43 which receive the clevers 44 on the cover. The clevers 44 are apertured to receive pins which mount locking links, as described more fully in copending application Serial No. 394,130. The locking nut 45 provides means for locking the manhole cover in its closed position. This manhole is provided in the position shown for the purpose of permitting inspection and access to both the channel of the spout extending from the valve and the discharge end of the spout at its connection to the discharge line 7. In other words the manhole permits inspection and cleaning of the entire discharge line.

It will be understood that the line connecting the discharge end of the mixing valve and the autoclave is provided with a control valve (not shown), such for example as is described in co-pending application Serial No. 393,791, filed September 19, 1929.

The operation of the above described structure will now be appreciated. The acid tank 1 and dust hopper 2 are supplied with acid and dust respectively taken from any suitable storage. In order to insure a positive flow, hydrostatic pressure is used in both the tank and hopper. Preferably the acid tank is provided with a heating coil so as to regulate the temperature of the acid used. When it is desired to charge the autoclave or other receiving apparatus, the control valve, which is placed between the discharge end of the spout and intake of the autoclave, is closed and a vacuum pump, connected to the rotary autoclave 3, is operated. This places the autoclave under impartial vacuum. When the desired vacuum has been attained, which in ordinary runs is approximately ten inches, the control valves in the acid and dust lines (not shown) and the control valve in the discharge line between the mixing valve and the autoclave are opened. The cause of the positive pressure on the acid and dust, supplemented by the vacuum in the autoclave, the ingredients are rapidly drawn through their respective conduits through the mixing valve and into the autoclave. In commercial operations it is found desirable to continue the operation of the vacuum pump during the charging period so as to maintain the charging conditions constant and minimize any back pressure on the charging mixture. In the typical operation with the apparatus described, an autoclave of ten tons capacity may be charged in less than three minutes. After the autoclave has been charged with the desired amount of material the control valve in the discharge line from the mixing valve is closed, sealing off the autoclave. The conditions within the autoclave are then controlled and maintained to insure a thorough conversion of the material, as described in the copending application referred to. After conversion under superatmospheric pressure the autoclave may be placed under a vacuum, supplemented or not as desired by applied heat for the purpose of drying the conversion products.

It will be understood that in this type of operation the respective quantities of acid and dust entered into the mixture at any given moment may be accurately controlled by an adjustment or setting of the handles 36. In this operation acid enters in a solid stream through the pipe 12, is then extended into a thin conoidal film by the coaction of the valve ring 24 and valve seat 18. Simultaneously dust flows down through the center of the ring 33 and is encompassed and mixed with the acid film. This apparatus, therefore, provides for an eminently rapid charge to the autoclave, the proportions or ratios of the ingredients of which are accurately and constantly maintained.

The provision of the central sleeve 23 provided with the detachable rim 24 provides for easy inspection and replacement of the parts subjected to wear. By providing for adjustment through the intermediacy of the sleeve 23, the space 13 is left open and unrestricted for the flow of acid, in contradistinction to the apparatus of the earlier application referred to in which this space was partially obstructed with portions of the adjusting mechanism.

It will be understood that the apparatus may be suitably lubricated, as for example by means of the oil ducts 46, so as to permit easy vertical displacement of the sleeve 23.

While a preferred apparatus is described, it is to be understood that this is given merely for the purpose of explaining the underlying features of the improvement. The invention is intended to comprehend all mechanical modifications which may be availed of within the scope of the present disclosure.

I claim:

1. An apparatus for compounding dust and a liquid comprising a valve body having an interior circular channel for receiving the liquid means to tangentially introduce liquid to said channel, a seat below said channel, a hollow sleeve serving as a conduit for the dust and terminating closely adjacent the seat the diameter of the sleeve being considerably greater than the space between the sleeve and the seat, and means to move the sleeve in a vertical plane to thereby vary the distance between the terminal of the sleeve and the seat.

2. An apparatus for compounding a dust and a liquid comprising a valve body having an interior circular channel and a tapered valve seat positioned below the channel, a hollow sleeve extending downwardly into the channel and having a laterally extending tapered part contiguous the seat the diameter of the sleeve being considerably greater than the distance between the valve seat and the tapered part and the end of the sleeve terminating a considerable distance inwardly of the valve seat, and means to displace the valve and thereby vary the distance between said part and said seat.

3. An apparatus for compounding a dust and a liquid comprising a valve body having an interior circular channel for receiving the liquid means to introduce a liquid tangentially into said channel, a tapered seat below said channel and communicating with said channel throughout its circumference, a hollow sleeve of relatively large internal diameter serving as a conduit for the dust and extending downwardly into the channel and terminating in the plane of the seat but positioned inwardly of the seat, and means to move the sleeve vertically to thereby vary the distance between the said sleeve and said seat.

4. An apparatus for compounding phosphate rock dust and acid comprising a valve body having an interior circular channel for receiving liquid acid means to introduce acid tangentially into said channel, a seat below the said channel and communicating with said channel throughout its circumference, a hollow sleeve serving as a conduit for the dust and extending downwardly into the channel and having a lateral extension in the plane of the seat a removable part secured to the extension, said part being positioned closely adjacent the seat, and means to displace the sleeve and thereby vary the distance between said part and said seat.

5. An apparatus for compounding phosphate rock dust and acid comprising a valve body and an interior circular channel, means to introduce acid tangentially into said channel, a tapered circular valve seat communicating with the channel throughout its circumference, a hollow sleeve serving as a conduit for the dust and extending downwardly into the channel and terminating in the area of the valve seat, and a detachable ring secured to the lower portion of the sleeve and coacting with the valve seat upon movement of the sleeve to provide a variable aperture for the flow of acid.

6. An apparatus for compounding phosphate rock dust and acid comprising a valve body having an interior circular channel for receiving the liquid, means to introduce liquid into said channel so that it will have a whirling motion, a seat below said channel over which the liquid is adapted to flow in a whirling path, a hollow sleeve serving as a conduit for the dust and terminating adjacent the seat and means to move the sleeve to vary the distance between the bottom of the sleeve and the seat to regulate the quantity of acid which reaches the interior circular channel in the valve body.

7. An apparatus for compounding a dust and a liquid comprising a valve body having an interior circular channel and a tapered valve seat positioned below the channel, a hollow sleeve extending downwardly into the channel and having a portion contiguous to the seat, means to relatively displace the valve seat and the hollow sleeve to vary the distance between the parts and means to introduce a liquid tangentially into the interior circular channel of the valve body so that the liquid will have a whirling motion in its path over said seat.

8. An apparatus for compounding phosphate rock dust and an acid comprising a valve body having an interior circular channel for receiving the acid, means to introduce the acid tangentially to said channel, a tapered seat below the channel and communicating with said channel over which seat the acid is adapted to pass with a whirling motion, a hollow sleeve serving as a conduit for the dust and extending downwardly beyond said channel and toward said tapered seat, and means to move the sleeve to vary the distance between the lower end of the hollow sleeve and the seat to regulate the quantity of acid escaping from the interior circular channel of the valve body.

GEORGE C. PFAFF.